United States Patent Office 2,813,105
Patented Nov. 12, 1957

2,813,105

ISOBUTYRIC DERIVATIVES HAVING THERAPEUTICAL PROPERTIES AND PROCESS FOR THEIR PREPARATION

Paolo Galimberti, Pavia, and Vittorina Gerosa, Milan, Italy, assignors to Società Italiana Prodotti Schering, Milan, Italy No Drawing. Application February 24, 1955,
Serial No. 490,415

2 Claims. (Cl. 260—397.4)

It is a purpose of the present invention to introduce the isobutyric group

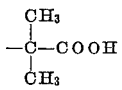

in the molecule of some organic compounds showing therapeutical activity, in order to improve the solubility of said compounds and to eliminate or remarkably reduce their toxicity.

The research work aimed at introducing the isobutyric group into some substances the pharmacological properties whereof were known and which contain groups or radicals capable of being substituted by the isobutyric group. According to this invention a new derivative of oestrone is obtained by substituting the isobutyric group for the hydrogen atom of the hydroxyl group in the oestrone, thus:

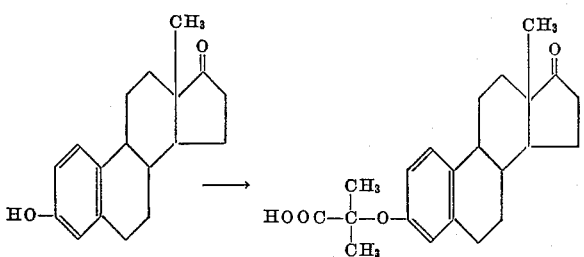

The alkali metal salts of this 1,3,5-(10)-oestratriene-17-on-3-hydroxy-α-isobutyric acid are perfectly water soluble. This product has shown an oestrogenic activity eight times lower than the one afforded by oestradiene benzoate, but the secondary toxic phenomena due to oestrone entirely disappeared.

Example I.—1,3,5-(10)-oestratriene-17-on-3-hydroxy-α-isobutyric acid

One gram of oestrone (M. P. 258–260° C.; $[\alpha]_D^{20°\,C.}=+166°$ (1% solution in dioxane) is introduced in a flask fitted with reflux condenser, and is dissolved into 20 cc. of anhydrous acetone and treated with 0.87 g. of chemically pure sodium hydroxide in pellets and with 0.62 g. of chemically pure chloroform. The mixture is heated under reflux on a water bath for about 6 hours, then the solvent is expelled by distillation and the residue is treated with 20 cc. of distilled water. The clear solution thus obtained is made acidic with diluted hydrochloric acid until it shows an acidic reaction when using Congo red as the indicator: a white precipitate is formed which is vacuum filtered and repeatedly washed with small portions of chilled distilled water. The precipitate is then transported into a 50 cc. beaker and is treated, cold, with a saturated solution of sodium bicarbonate, while stirring for at least two hours. A small amount of undissolved oestrone is left, which did not take part in the reaction and is recovered. The solution is vacuum filtered and from the filtrate the acid is precipitated again by adding diluted hydrochloric acid until the solution shows an acidic reaction with the Congo red as indicator, then the solution is filtered again and is finally washed by employing small amounts of chilled distilled water. The filtrate is dried in an evacuated desiccator containing sulphuric acid.

There are obtained, as an average, 1.065 g. of 1,3,5-(10)-oestratriene-17-on-hydroxy-α-isobutyric acid, as a white substance which, when crystallized from boiling ethyl alcohol, is formed of small prismatic crystals having a melting point comprised between 178° C. and 180° C. Yield: 81% of the calculated quantity.

The 1,3,5 - (10) - oestratriene-17-on-3-hydroxy-α-isobutyric acid shows a specific rotation $[\alpha]_D^{20°\,C.}=+136°$ (1% solution in dioxane). It shows definitely acidic reaction, it is soluble in alkaline carbonate solutions, wherefrom it can be separated by making them acid with mineral acids, it is soluble in ethyl alcohol, methyl alcohol, chloroform, acetone, dioxane, ethyl ether; it is insoluble in petroleum ether and in ligroin. 0.1 g., treated with 1 cc. of concentrated sulphuric acid impart to the acid solution an orange-red colour with a light green fluorescence. By dilution with 3 cc. of distilled water, the shade of the colour darkens and, after a few hours, a precipitate is formed. An equal quantity of oestrone, subjected to the same treatment shows the same behaviour except that the precipitate is formed immediately.

The foregoing description shows that the introduction of the isobutyric group leads to improved oestrogenic compounds which have a high solubility in aqueous solvents in general and which thus broadly extend their therapeutic applications; these compounds can be administered by hypodermic injections using an aqueous vehicle and the toxicity of the original or parent material is eliminated.

What we claim is:

1. A process for producing α-isobutyric derivatives of the compound of the formula

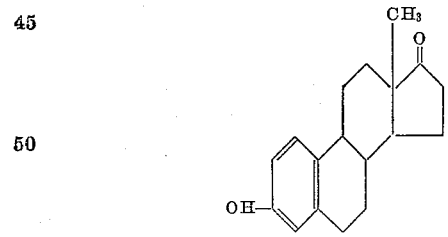

comprising dissolving said compound in a mixture of anhydrous acetone and chloroform, in the presence of sodium hydroxide, refluxing for not less than 6 hours the solution thus obtained, removing the solvent by distillation, treating the residue with water, filtering, treating the filtrate with dilute hydrochloric acid until a pH of less 4.5 is obtained and a precipitate is formed, washing said precipitate with cold water, treating said precipitate for at least 2 hours with saturated aqueous sodium bicarbonate solution, filtering, acidifying the filtrate with diluted hydrochloric acid until a pH of less 4.5 is obtained, filtering, washing the precipitate obtained with cold water and drying said precipitate.

2. An oestrogenic substance having the formula
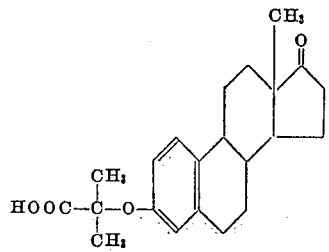
References Cited in the file of this patent
UNITED STATES PATENTS
| | | | |
|---|---|---|---|
| 2,054,271 | Schwenk | | Sept. 15, 1936 |
| 2,522,177 | Huffman | | Sept. 12, 1950 |
| 2,588,802 | Burtner | | Mar. 11, 1952 |
| 2,630,454 | Bock | | Mar. 3, 1953 |
| 2,648,665 | Baker | | Aug. 11, 1953 |
| 2,704,757 | Danfeld | | Mar. 22, 1955 |